(12) United States Patent
Theuerkauf

(10) Patent No.: US 7,497,498 B2
(45) Date of Patent: Mar. 3, 2009

(54) HOOD FOR A CONVERTIBLE

(75) Inventor: Jürgen Theuerkauf, Bramsche (DE)

(73) Assignee: Wilhelm Karmann GmbH, Osnabrück (DE)

( * ) Notice: Subject to any disclaimer, the term of this patent is extended or adjusted under 35 U.S.C. 154(b) by 150 days.

(21) Appl. No.: 10/534,287

(22) PCT Filed: Nov. 5, 2003

(86) PCT No.: PCT/DE03/03665

§ 371 (c)(1),
(2), (4) Date: Jan. 9, 2006

(87) PCT Pub. No.: WO2004/041570

PCT Pub. Date: May 21, 2004

(65) Prior Publication Data

US 2006/0125282 A1 Jun. 15, 2006

(30) Foreign Application Priority Data

Nov. 8, 2002 (DE) .................................. 102 51 987

(51) Int. Cl.
B60J 7/12 (2006.01)

(52) U.S. Cl. .......................... 296/107.09; 296/107.15; 296/107.16

(58) Field of Classification Search ............ 296/107.01, 296/107.07, 107.09, 107.15, 107.16, 146.14
See application file for complete search history.

(56) References Cited

U.S. PATENT DOCUMENTS 6,270,143 B1 * 8/2001 Heselhaus et al. ...... 296/107.01
6,764,127 B2 * 7/2004 Obendiek ............... 296/107.09
6,886,880 B2 * 5/2005 Heselhaus ............... 296/107.07
6,902,223 B2 * 6/2005 Hollenbeck et al. .... 296/107.09
7,032,951 B2 * 4/2006 Powell .................. 296/107.01

FOREIGN PATENT DOCUMENTS

| DE | 198 46 006 A1 | 4/2000 |
|---|---|---|
| DE | 199 55 404 A1 | 5/2001 |
| DE | 100 39 853 C1 | 9/2001 |
| DE | 101 08 493 A1 | 9/2001 |
| EP | 0 521 307 A1 | 1/1993 |
| EP | 0 760 301 A1 | 3/1997 |
| EP | 0 974 480 A1 | 1/2000 |
| EP | 1 092 579 A1 | 4/2001 |
| EP | 1 101 642 A2 | 5/2001 |
| EP | 1 164 040 A2 | 12/2001 |
| EP | 1 164 042 A2 | 12/2001 |

* cited by examiner

Primary Examiner—Glenn Dayoan
Assistant Examiner—Gregory Blankenship
(74) Attorney, Agent, or Firm—Rothwell, Figg, Ernst & Manbeck, P.C.

(57) ABSTRACT

Disclosed is a hood (1) for a convertible (2), comprising a tail end/roof segment (6) and at least one other roof segment (7, 8). The roof segments (6, 7, 8) can be folded together in a Z-shape by means of a folding mechanism and at least the tail end/roof segment (6) is provided with a flexible roof skin (3) which is accommodated between opposite outer roof profiles (9, 10, 11) which are symmetrical in relation to a longitudinal axis (33) of the vehicle and which encloses a dimensionally stable rear window (12). The rear window (12) and the outer roof frame profiles (9), which are associated with the tail end/roof segment (6), are placed in a folded position when the hood (1) is open or unfolded from said position as a result of a movement in the same direction.

29 Claims, 20 Drawing Sheets

HOOD FOR A CONVERTIBLE

CROSS REFERENCE TO RELATED APPLICATION

Figure 1:
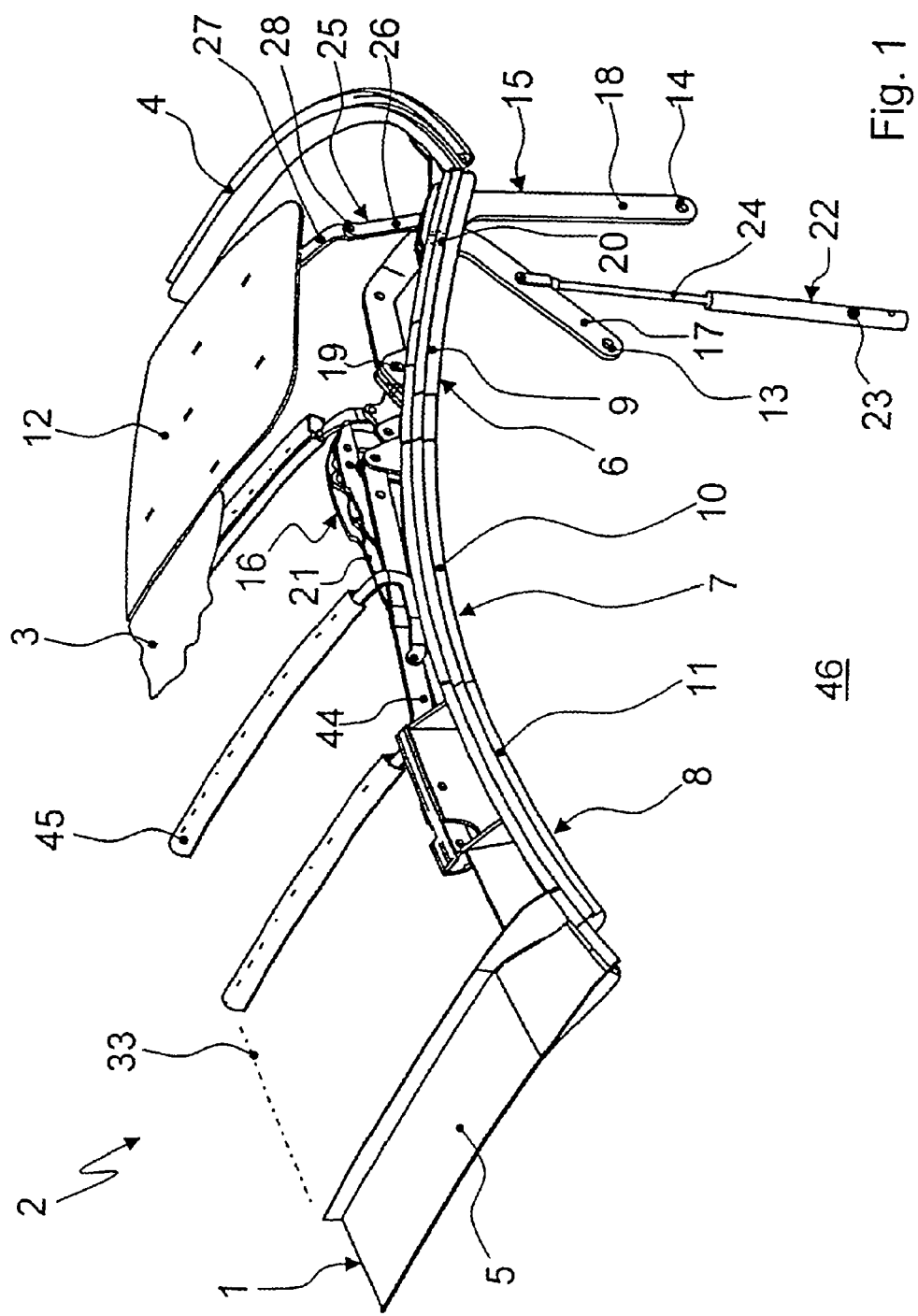

This application is a 35 USC § 371 National Phase Entry Application from PCT/DE 03/03665, filed Nov. 5, 2003 and designating the United States.

The invention relates to a convertible top for a convertible vehicle of the type defined more specifically in the preamble of Patent claim 1.

Such a convertible top for a convertible vehicle is known from DE 199 55 404 A1, for example. When the roof segments of the convertible top are converted from the top-up position, i.e., closed, and a folded position in which the top is completely open, i.e., down, the lateral roof frame profiles of the rear-end roof part, which have a pivot point fixedly provided on the body in a main bearing of the convertible top and form main pillars of the top and also form part of a C-pillar of the vehicle, are rotated about a vehicle transverse axis in the opposite direction relative to the rear window.

However, rotation of the main pillar and the rear window in opposite direction has the disadvantage that the textile roof membrane of the convertible top must have a very large length of cloth.

A high demand for material to form the textile roof membrane results in the need to design the area of the C-pillar of the vehicle to be wide enough as well, and it also has a negative effect on the packing height of the convertible top in the folded state, in which it is usually accommodated in a storage space in the rear-end area.[1]

[1] TN: Last line of text missing in source document.

However, the storage height, i.e., packing height of the folded roof is of great importance because a large packing height greatly limits the design freedom in the rear-end area of the vehicle as well as the possible dimensioning of a trunk space.

To avoid these problems encountered with a so-called soft top with a flexible roof membrane, the arrangement of the rear window in a rigid rear-end roof element is often proposed, this latter element being linked to a joint mechanism for adjustment of the roof. Examples of this are described in German patent documents DE 101 08 493 A1, DE 198 46 006 A1 and DE 100 39 853 C1.

The object of the present invention is to create a convertible top for a convertible vehicle having a soft top of the type described in greater detail above, in which the demand for material to form the textile roof membrane and the packing height in a folded position when the top is down are further reduced.

According to this invention, this object is achieved by the features in the characterizing part of Patent claim 1.

Due to the movement of the outer roof frame profiles forming the so-called main pillars and the dimensionally stable rear window in the conversion of the convertible top into or out of the folded position in the same direction, the convertible top can be implemented with much shorter lengths of cloth for the textile roof membrane, so that the area of the C-pillar of the vehicle can be designed to be very narrow; this is understood here to be the area between the rear window and a side window of the vehicle toward the rear end.

A narrow C-pillar design in turn allows the use of larger window areas, so that visibility for the driver is increased and therefore vehicle safety is increased.

In addition, because of the low demand for material for the flexible roof membrane, a significant reduction in packing height of the convertible top when folded and stored is achieved and there is a greater design freedom in the rear-end area of the vehicle, e.g., due to the possibility of smaller dimensions of the storage space for the top or creating an enlarged luggage area.

An especially small amount of material is needed in particular for the textile roof membrane when the rear window and the outer roof frame profiles of the rear-end roof segment are arranged essentially parallel to one another during their movement into or out of the folded position.

The movement of the rear window and the outer roof frame profiles of the rear-end roof segment in the same direction and preferably in parallel can be implemented with a simple design by connecting an outer roof frame via a hinge-connected four-bar linkage mechanism, with two joints of the four-bar linkage mechanism being fixedly provided on the body and two joints being provided on the respective outer roof frame profile.

To achieve a low packing height of the convertible top, it is advantageous if the roof segments in the folded position with the top down are situated at least essentially one above the other with the curvature in the same direction, and the outer roof frame profiles of at least one central roof segment are rotated about an axis that is at least approximately parallel to the longitudinal axis of the vehicle by means of a guide mechanism with respect to a position with the top up and are also shifted in the direction of the center of the vehicle.

In a particularly advantageous and visually attractive embodiment, the roof segments in the folded position are positioned one above the other in such a way that their respective curvature is facing away from the bottom of the vehicle, i.e., in the folded state their front and rear ends are each directed downward. However, in deviation from this, it is also possible while achieving a low packing height for the roof segments to be folded in such a way that the curvature of each is facing the bottom of the vehicle.

A simple design of the rotation and displacement of the outer roof frame profiles of the preferably one central roof section can be achieved if the guide mechanism of the outer roof frame profile has a guide rod connected to the convertible top mechanism, where the outer roof frame profile is axially displaceably guided on the guide rod and is preferably rotated by at least approximately 180° with respect to its longitudinal axis in an axial movement relative to the guide rod.

The guidance of the outer roof frame profile on the guide rod can be implemented in a simple manner by means of a sliding block, which engages in a spiral groove created in the guide rod, with the sliding block being connected to the kinematics of the mechanism of the convertible top via a coupling element for the axial displacement.

Alternatively to this, according to another preferred embodiment, it is also possible for the guide mechanism of the outer roof frame profile of the at least one central roof segment to have a control rod connected to the mechanism of the convertible top, said control rod being pivotable about a pivot axis running parallel to the transverse axis of the vehicle. The outer roof frame profile is hinge-connected to the control rod by a lever arrangement which is pivotable via tilted axes which run at an angle to the pivot axis of the control rod in such a way that the outer roof frame profile is displaced in the direction of the center of the vehicle by pivoting the control rod with respect to its longitudinal axis and/or and an axis parallel to the longitudinal axis of the vehicle.

In deviation from this, however, those skilled in the art could also select a different design suitable for the respective application case for rotation of a component with respect to a guide element.

In a preferred embodiment, the convertible top in accordance with the invention is a convertible top that can move automatically from a top-down position into a top-up position or vice versa, with the movement of the convertible top usually being accomplished through a hydraulic drive which drives a convertible top mechanism that comprises a convertible top gear assembly and optionally a cover for a convertible top receptacle space and all the elements movable thereby.

The outer roof frame profiles in the present sense may be designed in any way with regard to their cross section, their structure and their material composition, and they have gasket elements, e.g., in areas which are provided for contact with adjacent components such as side windows.

Other advantages and advantageous embodiments of the object in accordance with the invention can be derived from the description, the drawing and the patent claims.

Two exemplary embodiments of a convertible top in accordance with the invention are depicted in simplified schematic diagrams in the drawing and described in greater detail in the following description.

Figure 2:
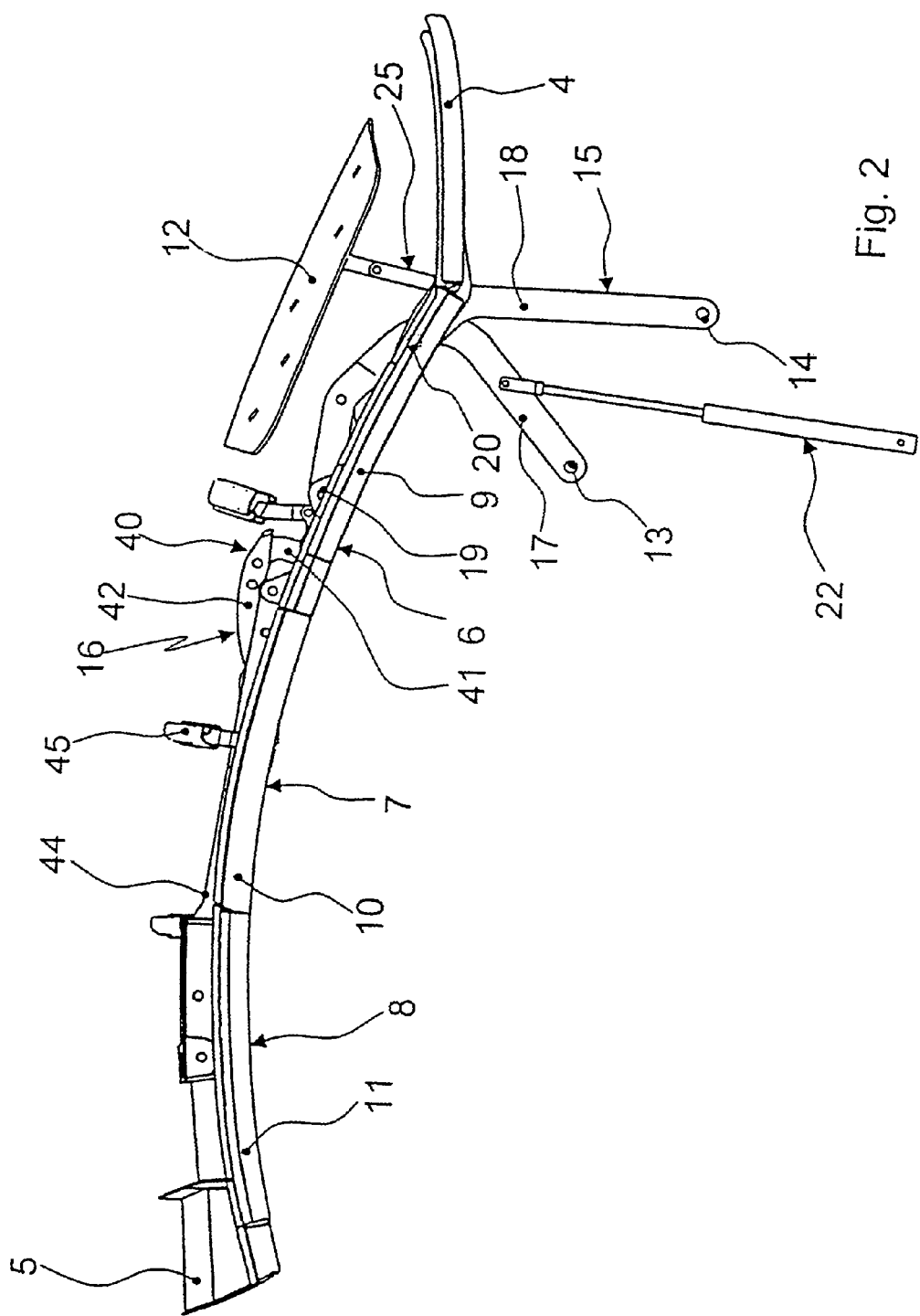
Figure 3:
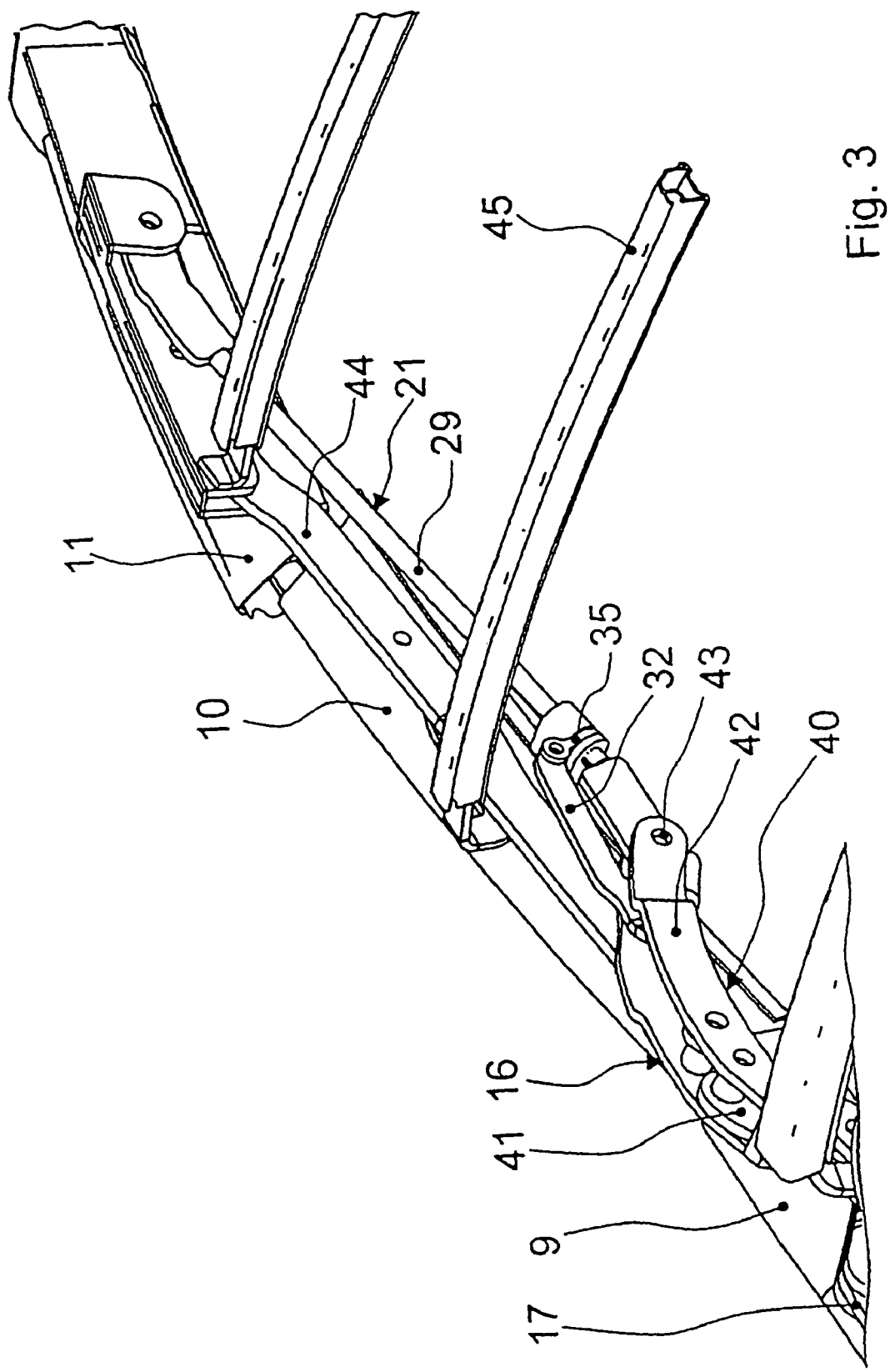
Figure 4:
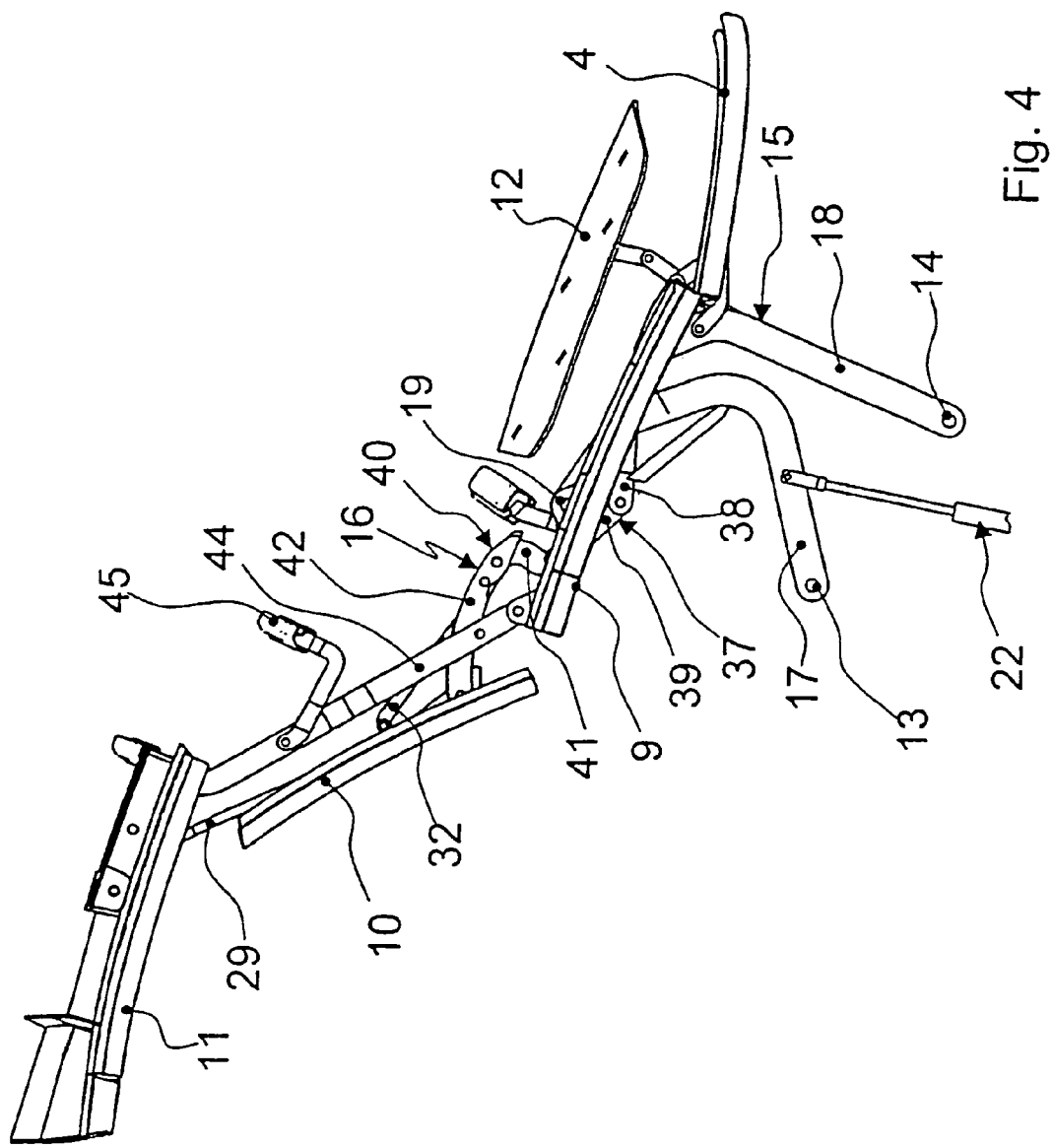
Figure 5:
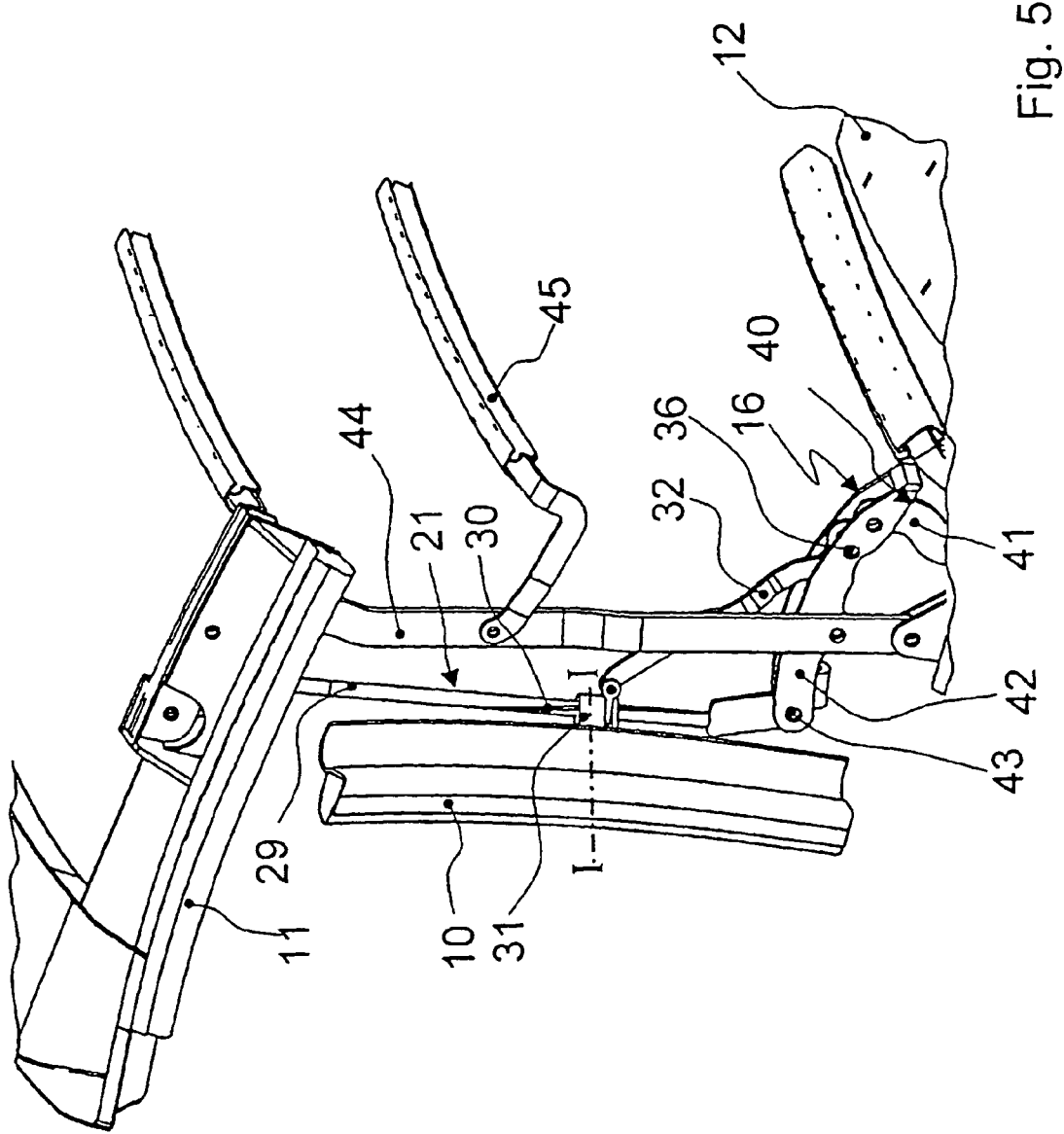
Figure 6:
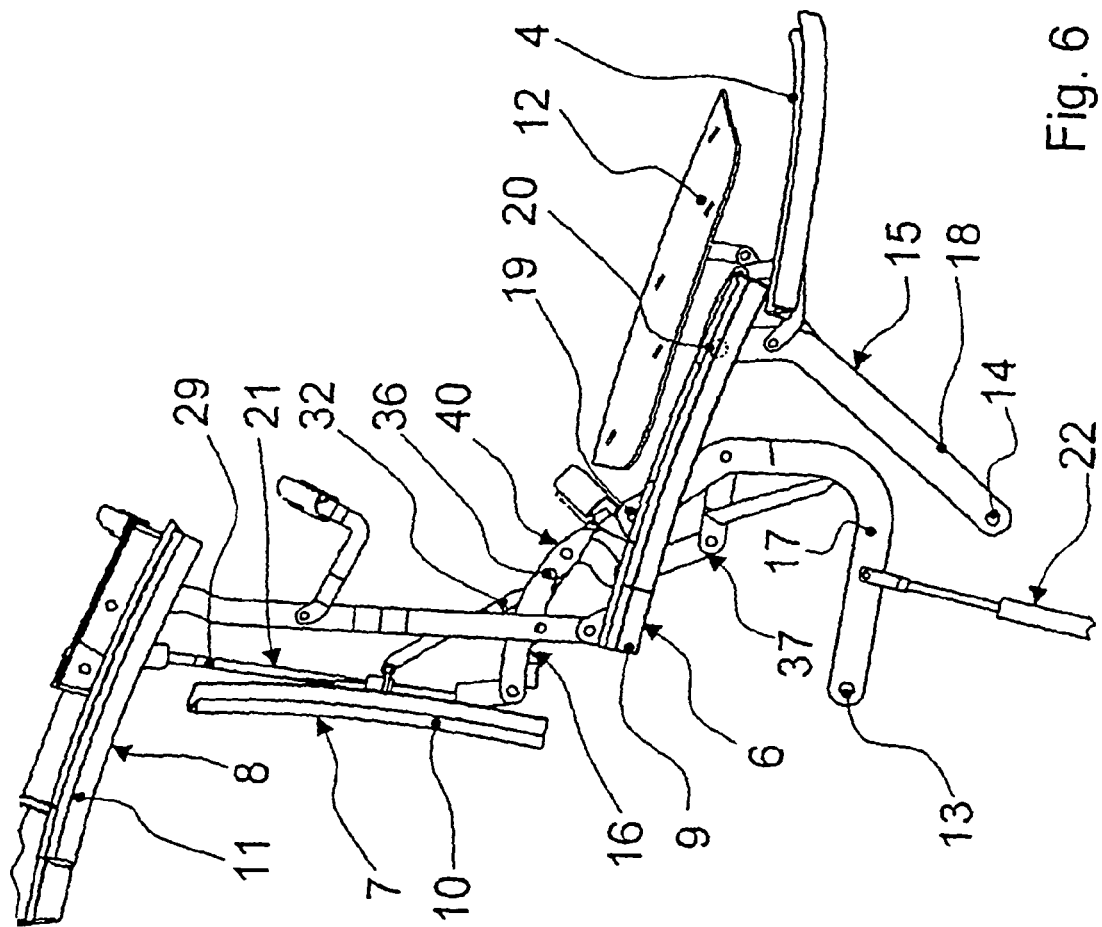
Figure 7:
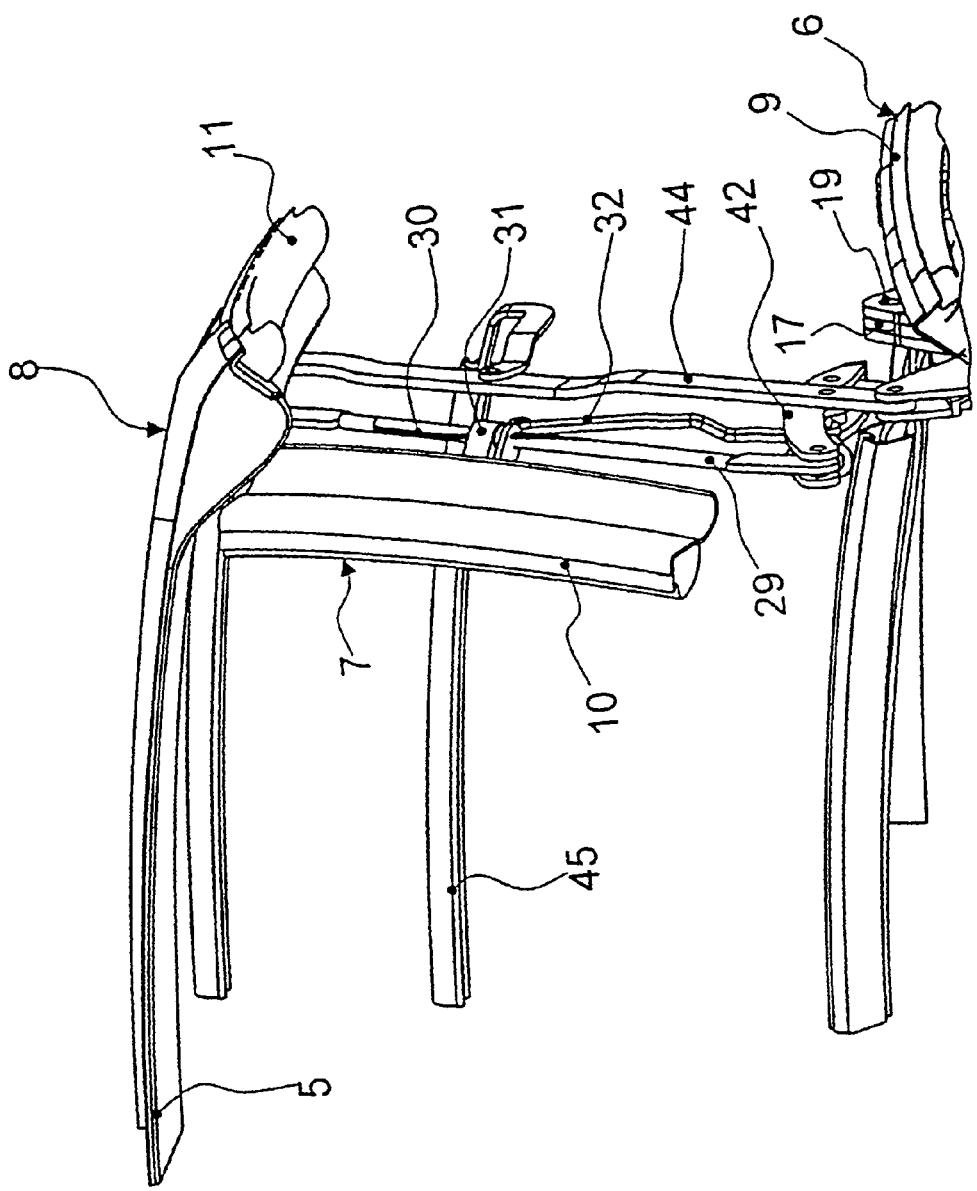
Figure 8:
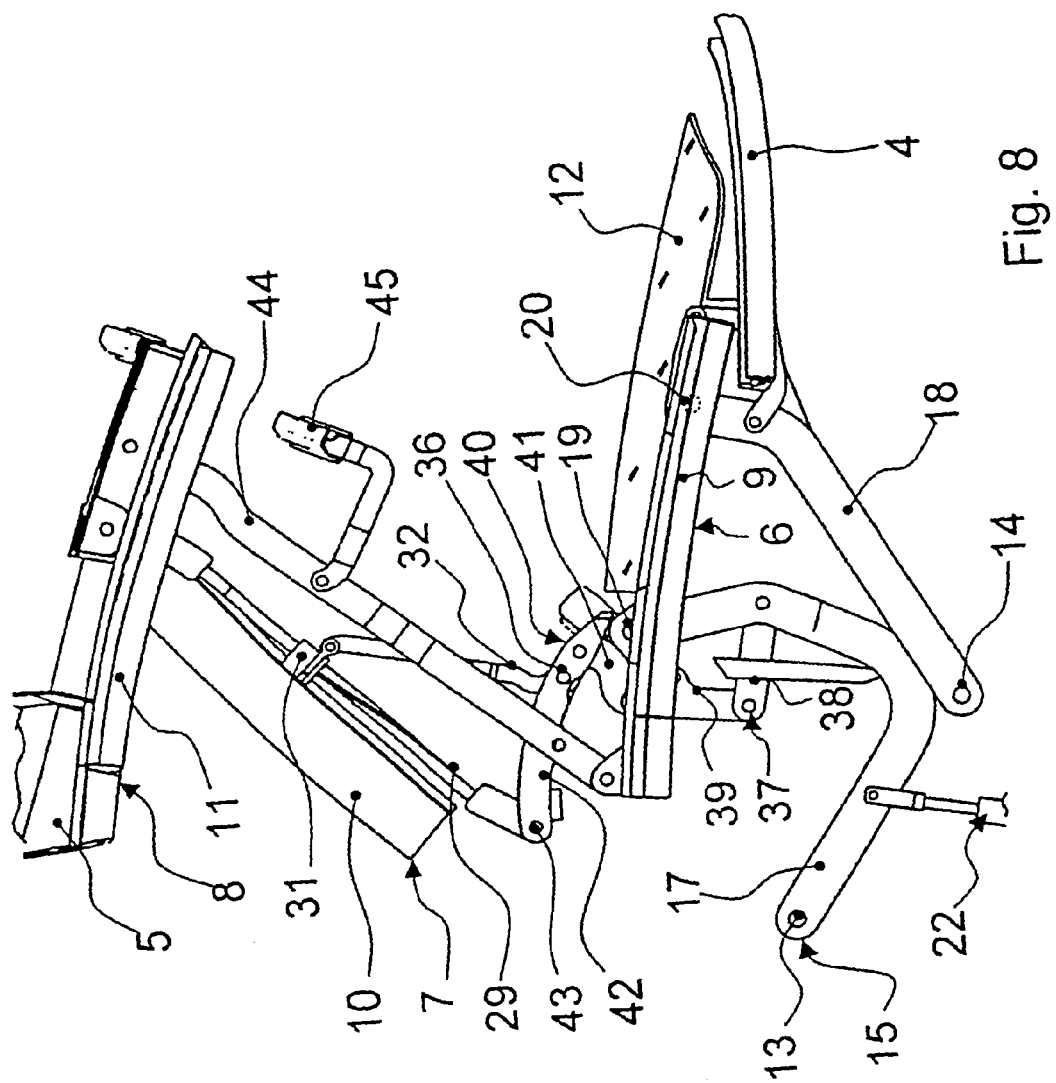
Figure 9:
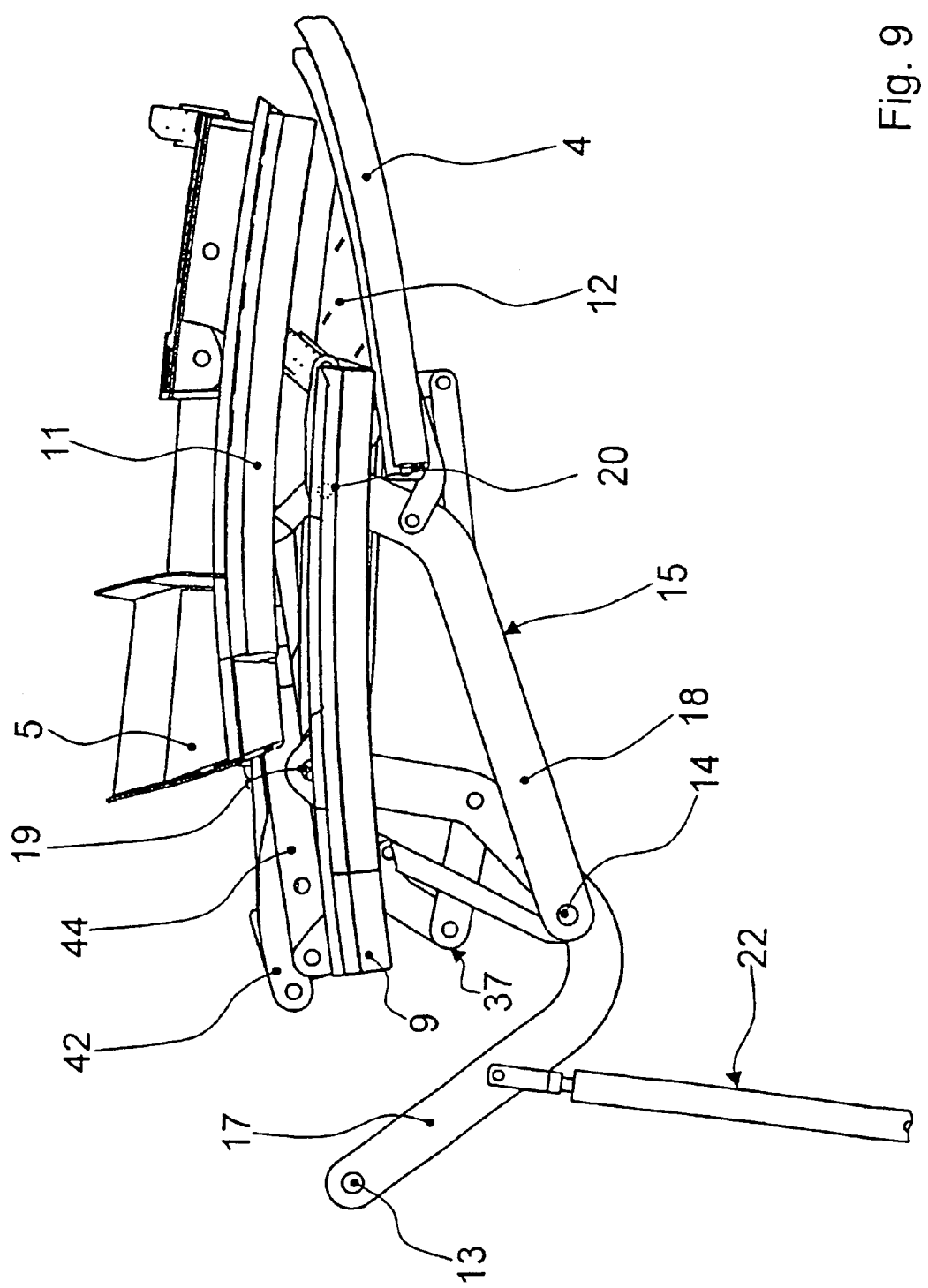
Figure 10:
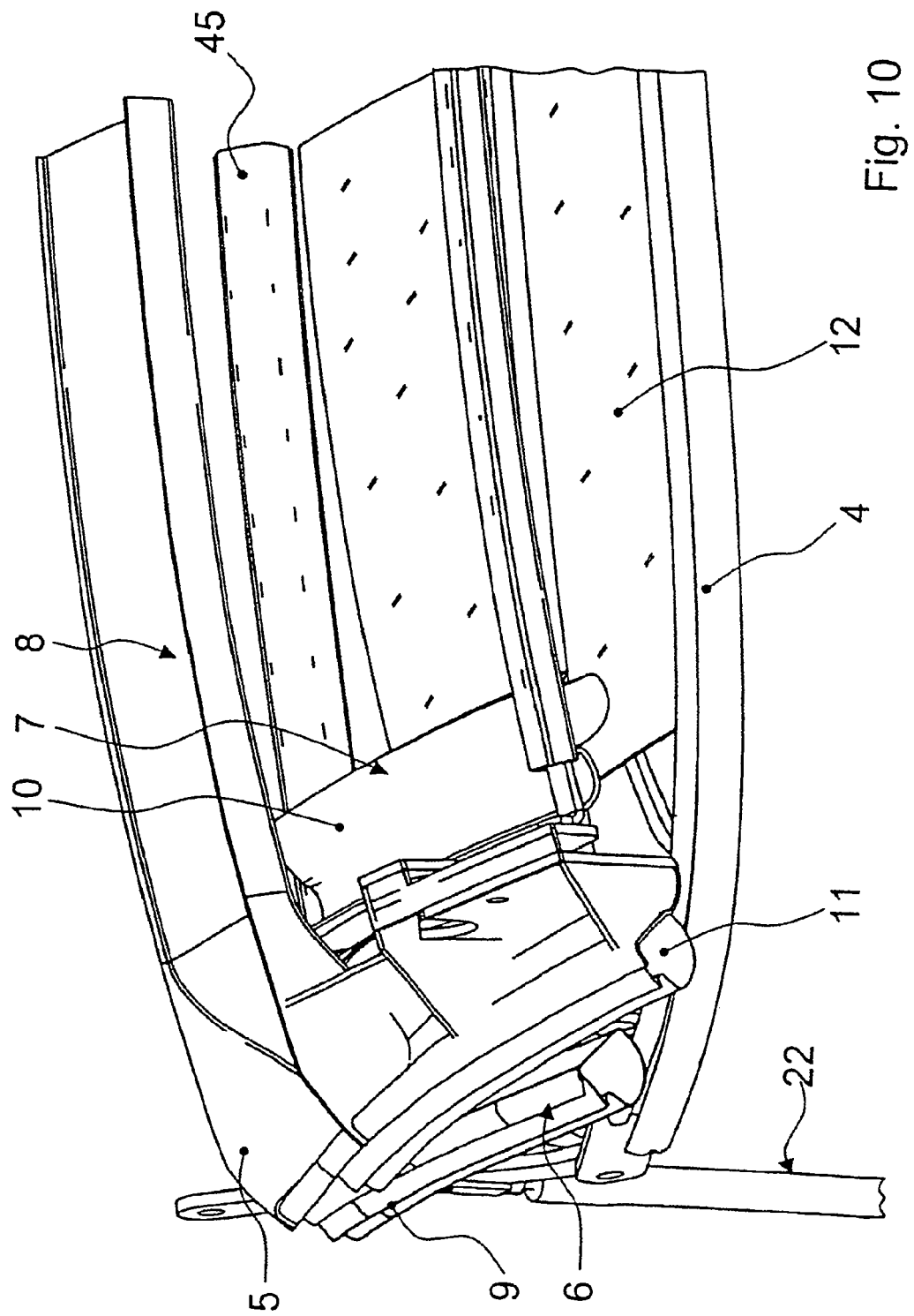
Figure 11:
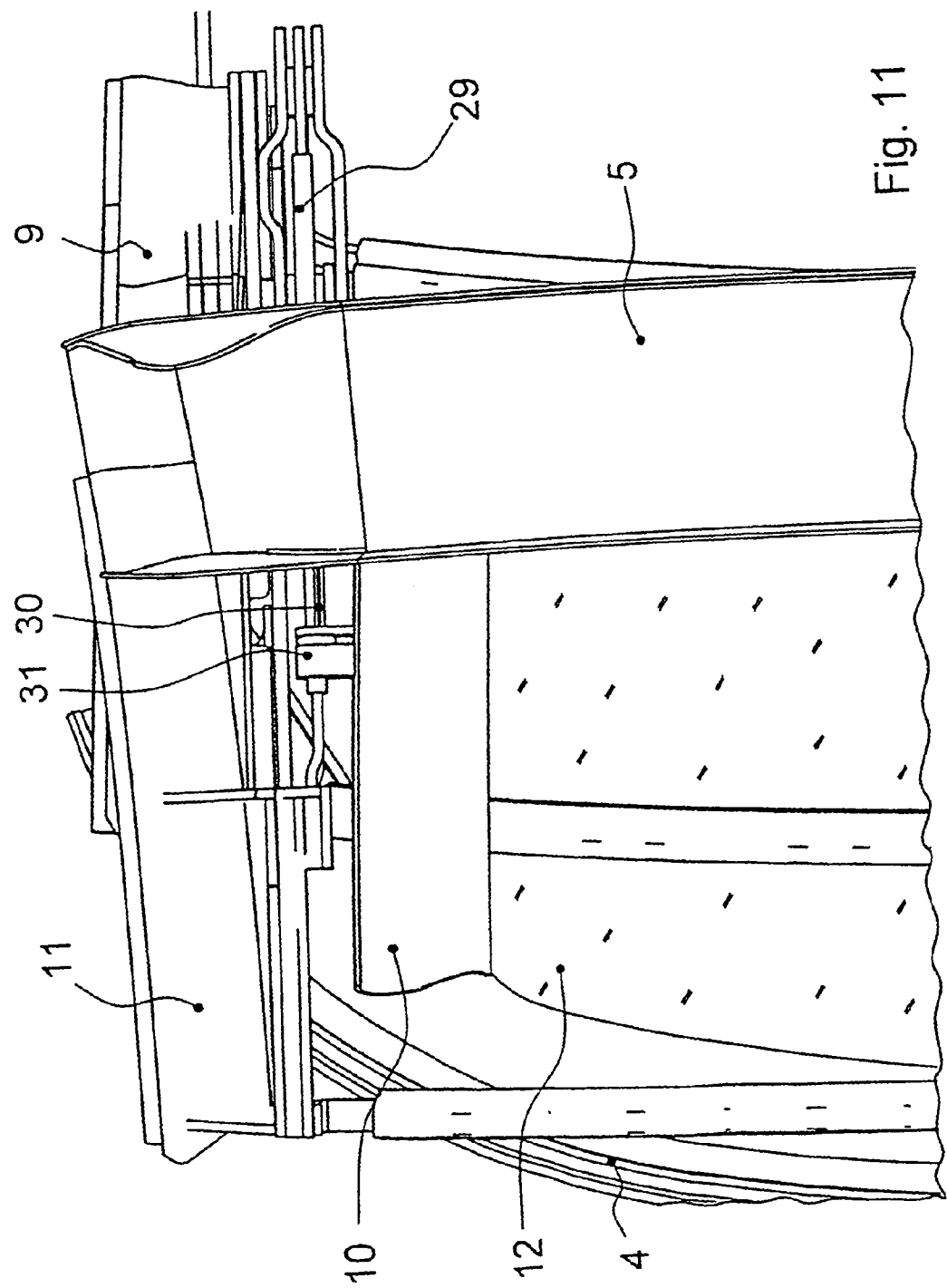
Figure 12:
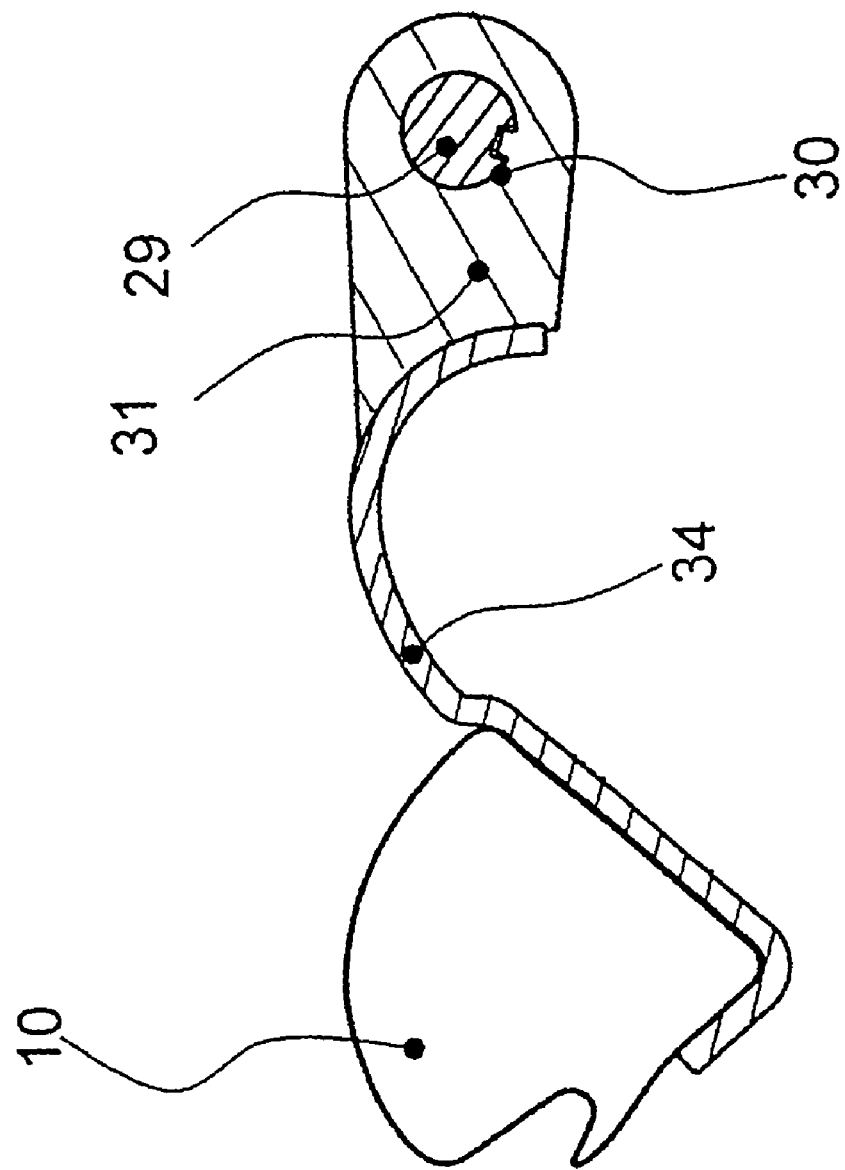
Figure 13:
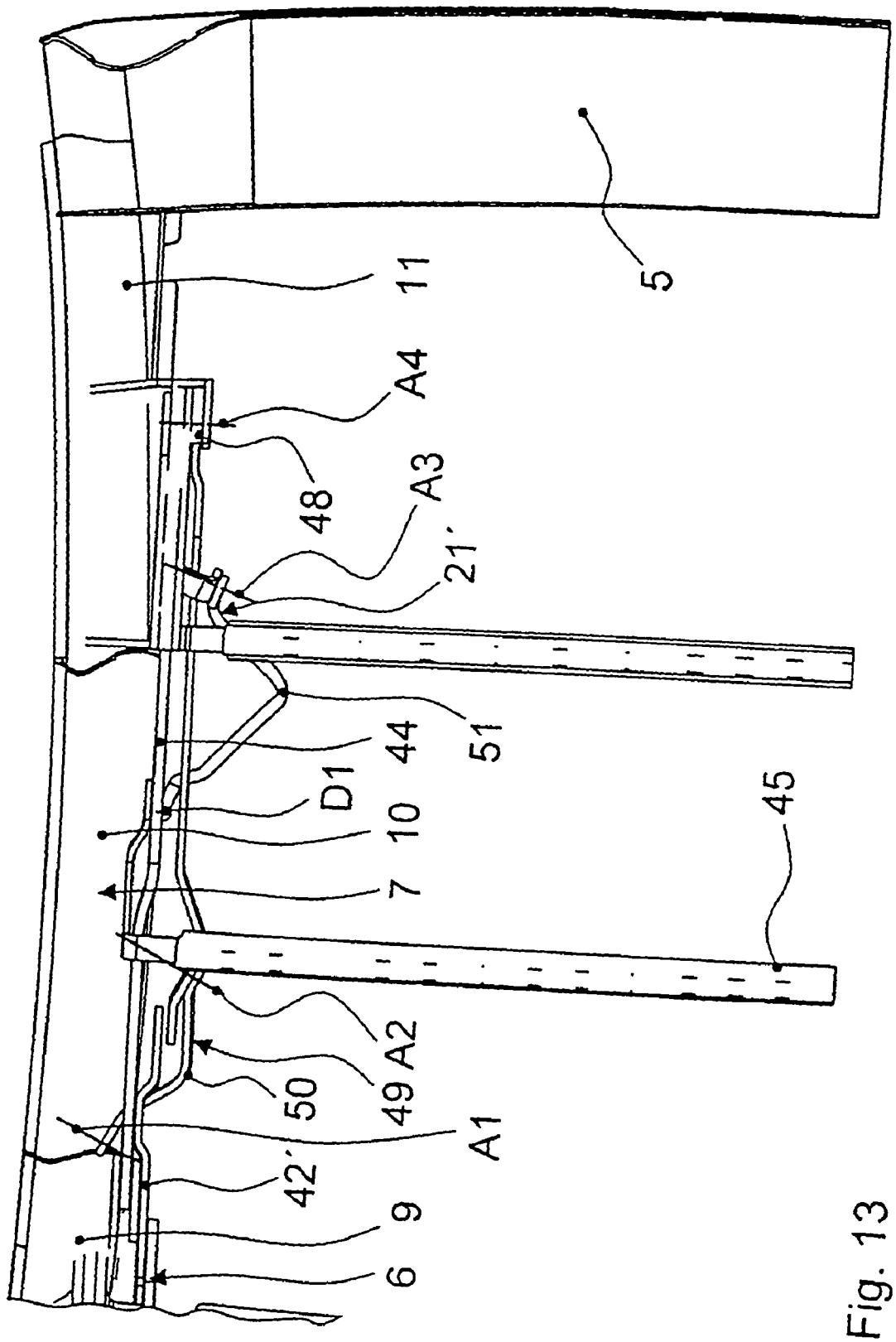
Figure 14:
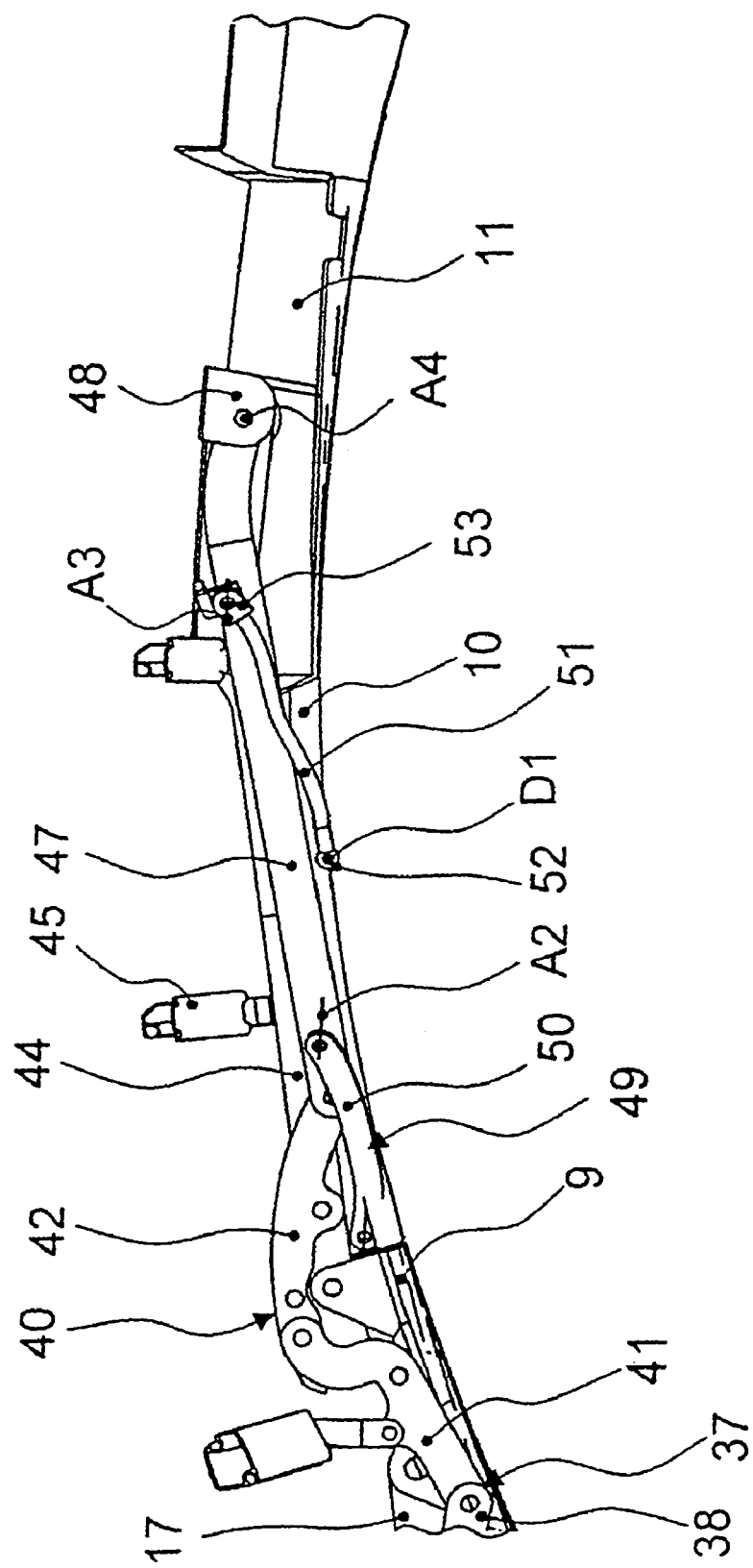
Figure 15:
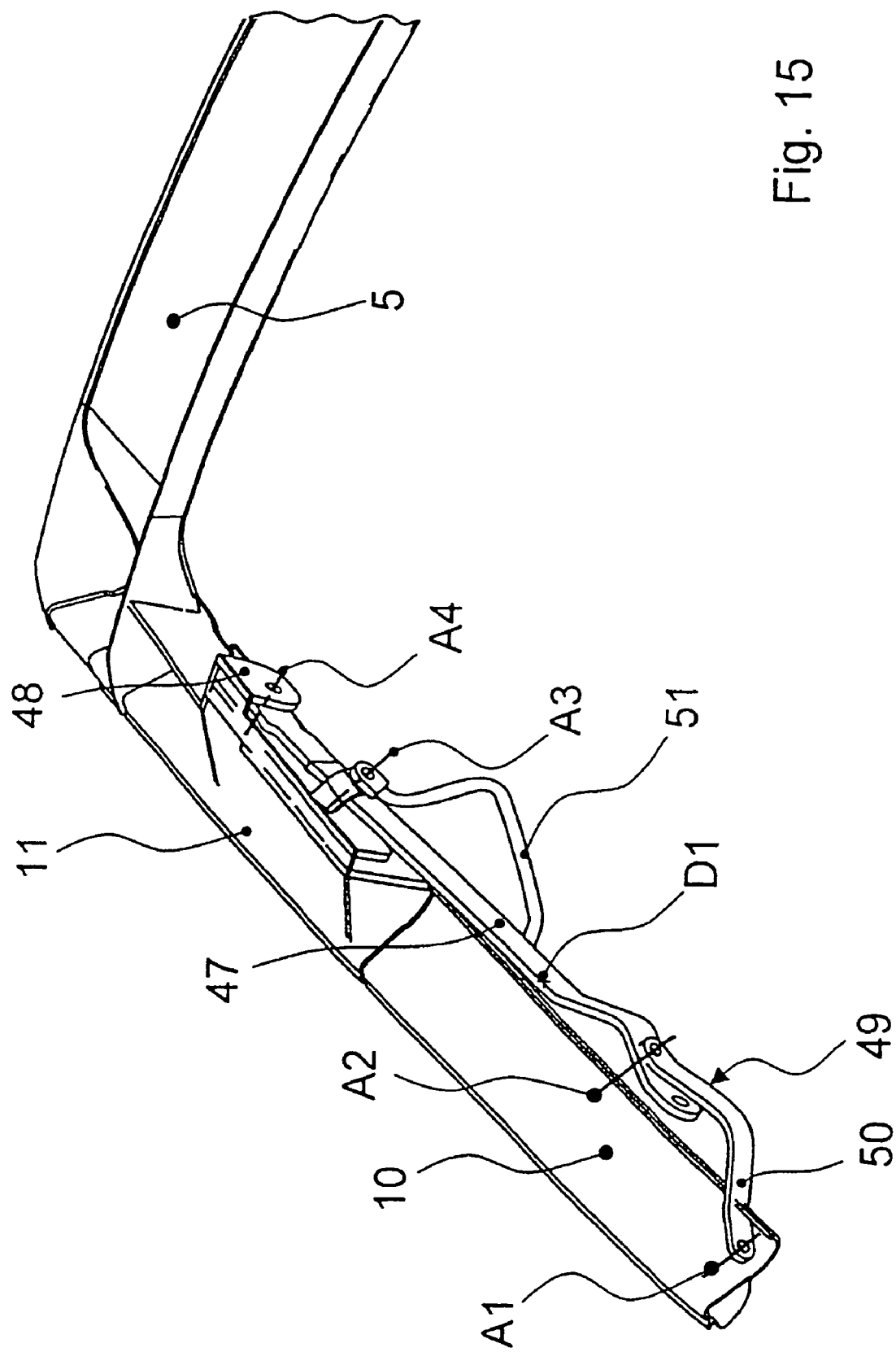
Figure 16:
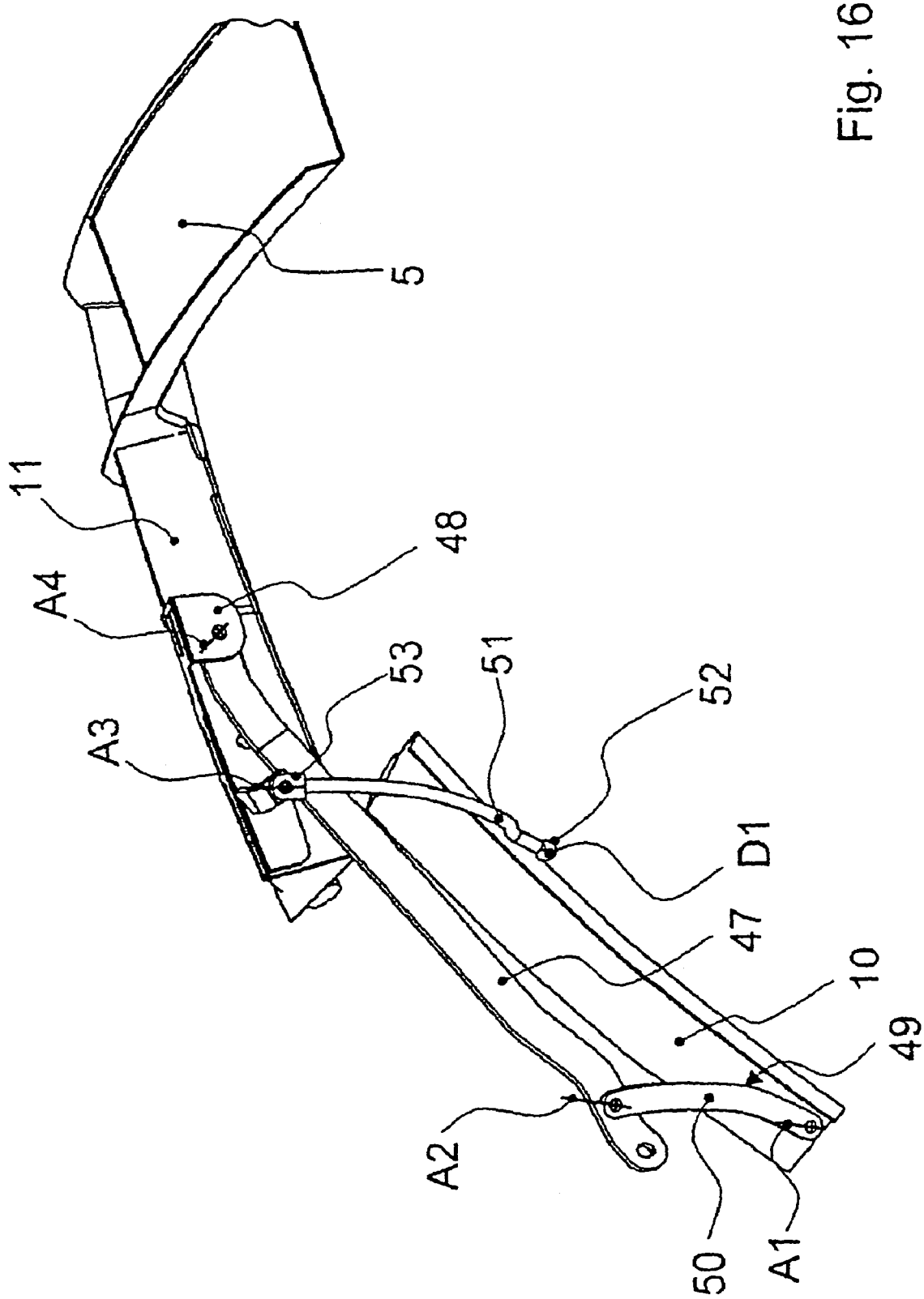
Figure 17:
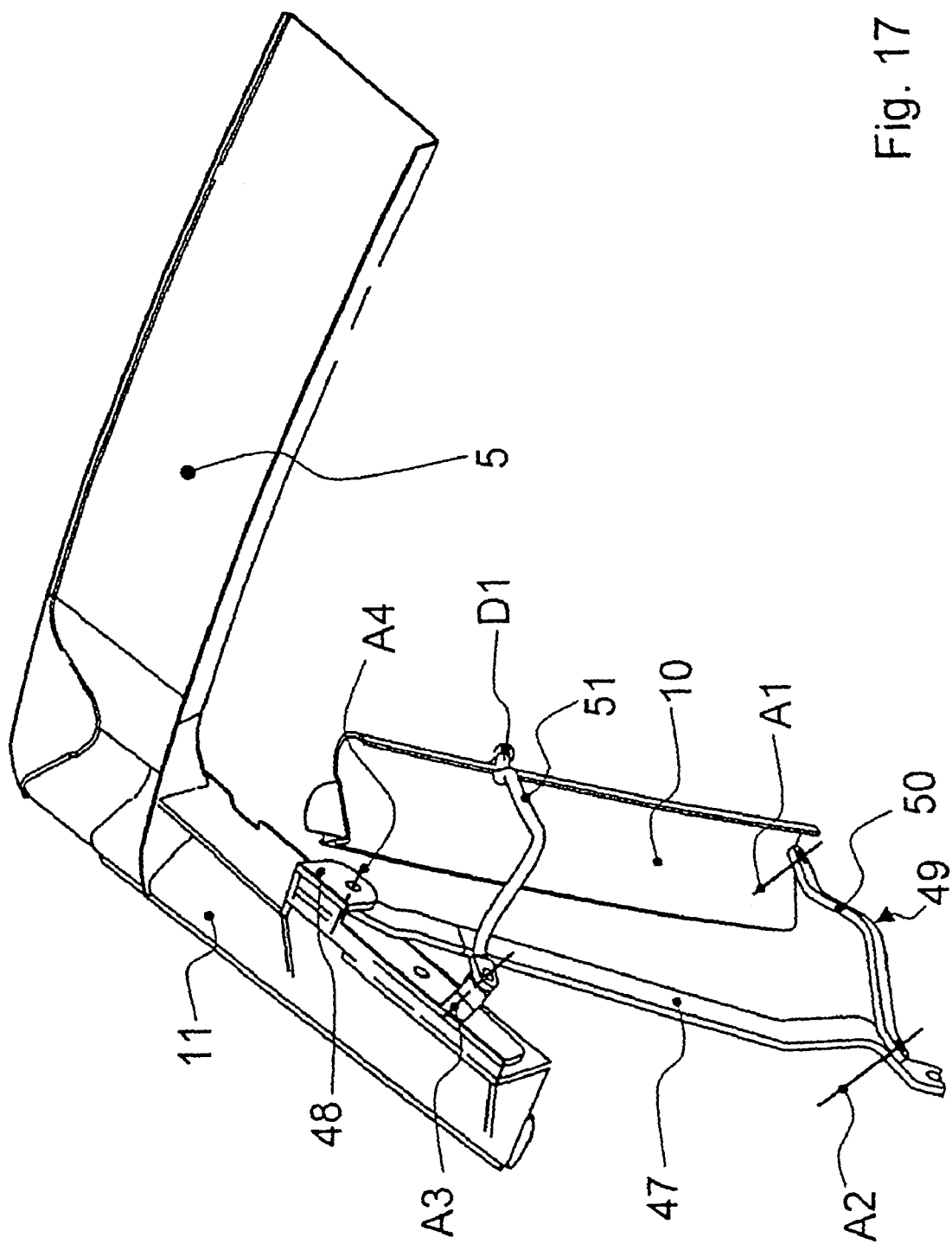
Figure 18:
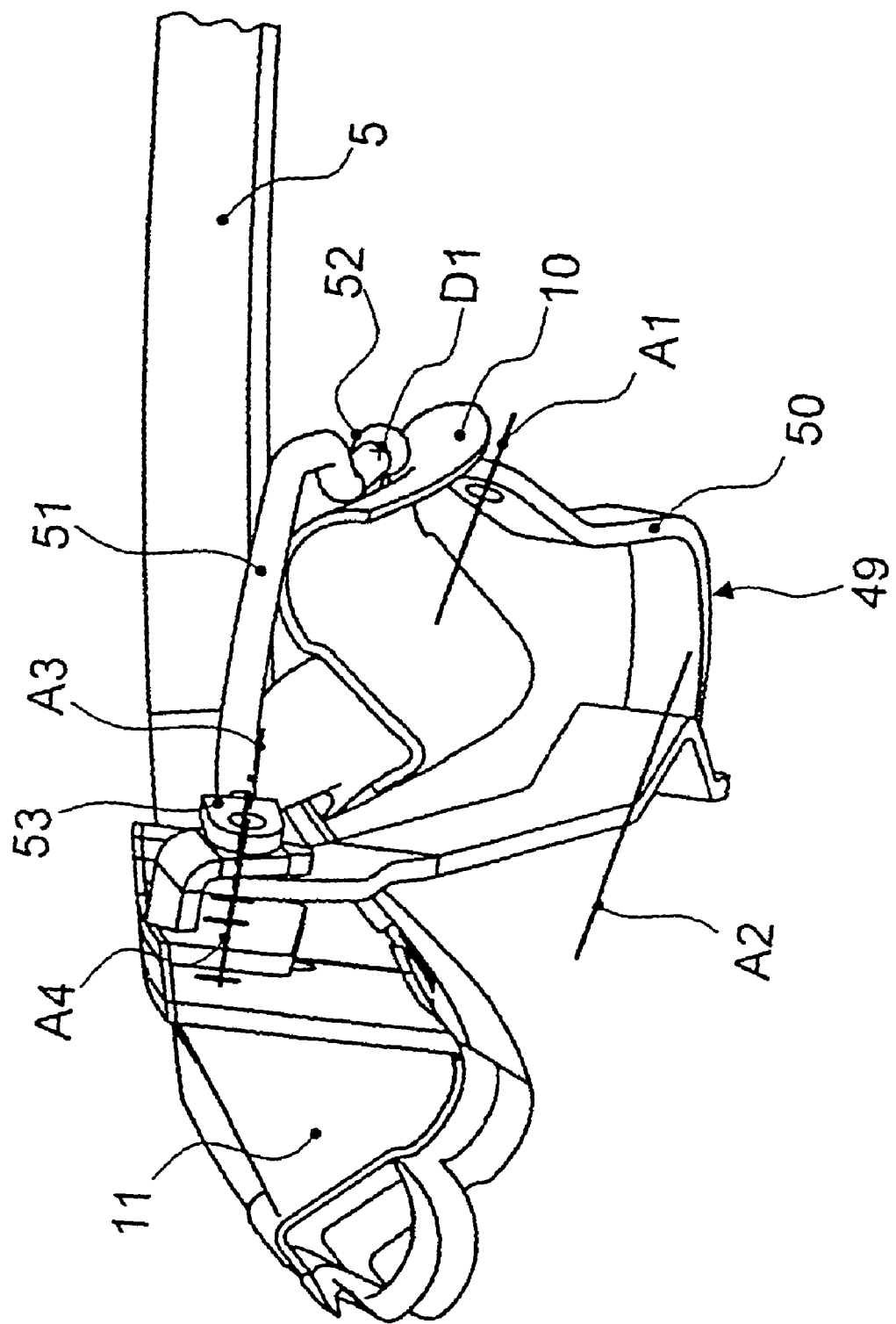

They show:

FIG. 1 a simplified three-dimensional view of a convertible top in accordance with the invention for a convertible vehicle, the top being shown alone in the up position;

FIG. 2 a schematic side view of the convertible top in the up position according to FIG. 1;

FIG. 3 a detailed drawing of a first embodiment of a convertible top mechanism from the perspective of the center of the vehicle forward after initiating a top-down movement of the convertible top, i.e., putting the top down, according to FIGS. 1 and 2;

FIG. 4 another side view of the convertible top according to FIG. 1 through FIG. 3 during a continued movement phase of the movement of putting the convertible top down;

FIG. 5 another detailed diagram of the convertible top mechanism from a perspective from the left of the vehicle forward while the top is going down;

FIG. 6 another side view of the convertible top according to FIG. 1 through FIG. 3, where the top is moving in the direction of the rear end of the vehicle;

FIG. 7 another sectional diagram of the convertible top mechanism from a perspective from the right side of the vehicle forward during the movement of putting the convertible top down;

FIG. 8 another movement phase of the convertible top according to FIG. 1 through FIG. 7, with the convertible top having moved further in the direction of the rear end of the vehicle in comparison to the diagram in FIG. 6;

FIG. 9 a side view of the convertible top according to FIG. 1 through FIG. 8 when folded and completely put down;

FIG. 10 the convertible top that is in the folded position in FIG. 9 in a three-dimensional view from a perspective from the left side of the vehicle forward;

FIG. 11 the convertible top in the folded position according to FIGS. 9 and 10, shown here in a top view;

FIG. 12 a simplified cross section along line I-I in FIG. 5;

FIG. 13 a sectional top view of a second embodiment of the convertible top mechanism with the top in the closed position;

FIG. 14 a side view of the convertible top mechanism according to FIG. 15 with the top in closed position from a perspective at the center of the vehicle;

FIG. 15 another greatly simplified perspective view of the second embodiment of the convertible top mechanism with the top in the closed position;

FIG. 16 the convertible top mechanism according to FIG. 15 during a first movement phase of the top after initiating the action of putting the top down [i.e., opening movement];

FIG. 17 the convertible top mechanism according to FIG. 15 and FIG. 16 during a phase of movement of the top further in the direction of the rear end of the vehicle;

FIG. 18 the convertible top mechanism according to FIG. 15 through FIG. 17, with the top having moved further in the direction of the rear end of the vehicle in comparison to the diagram in FIG. 17;.

Figure 19:
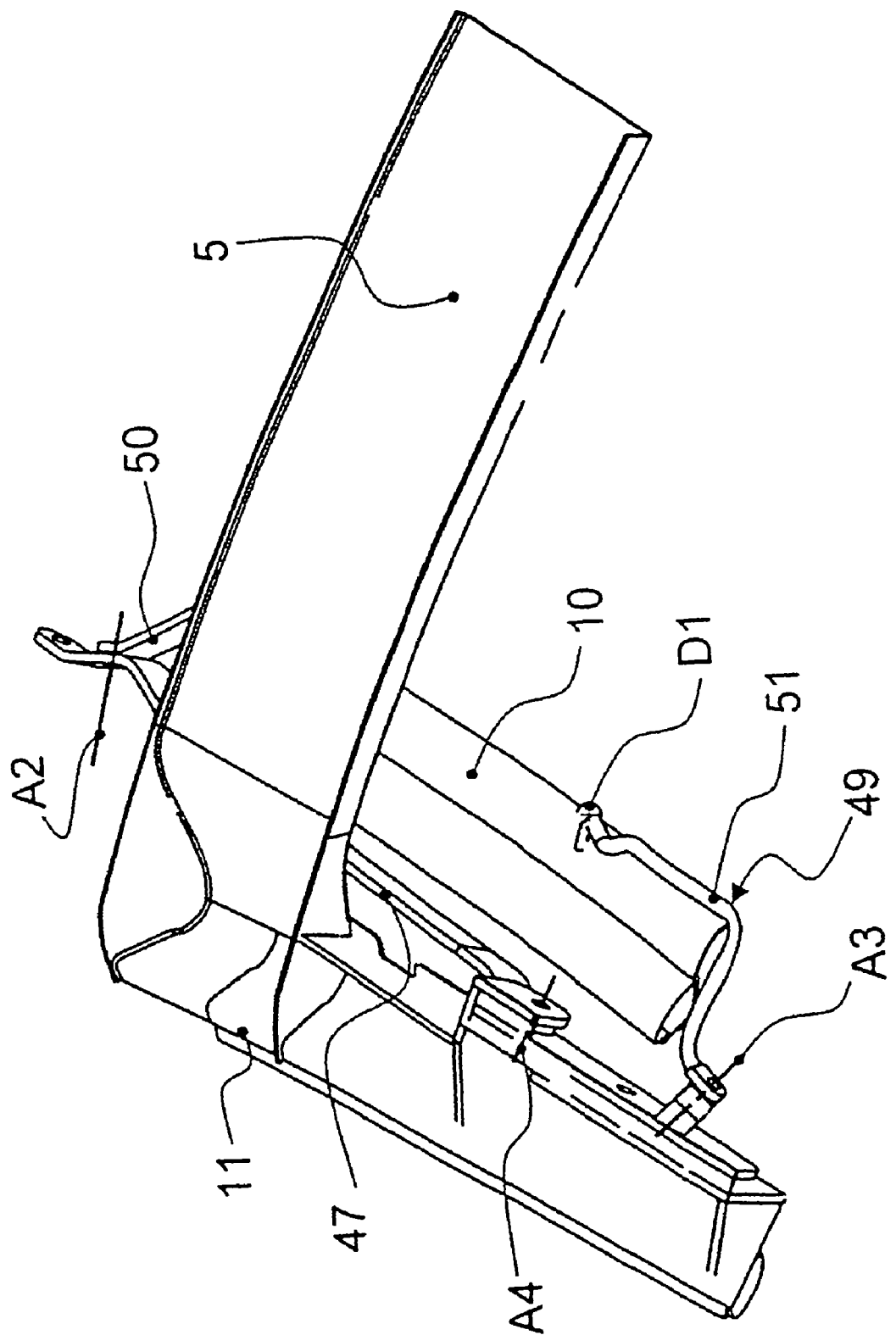
Figure 20:
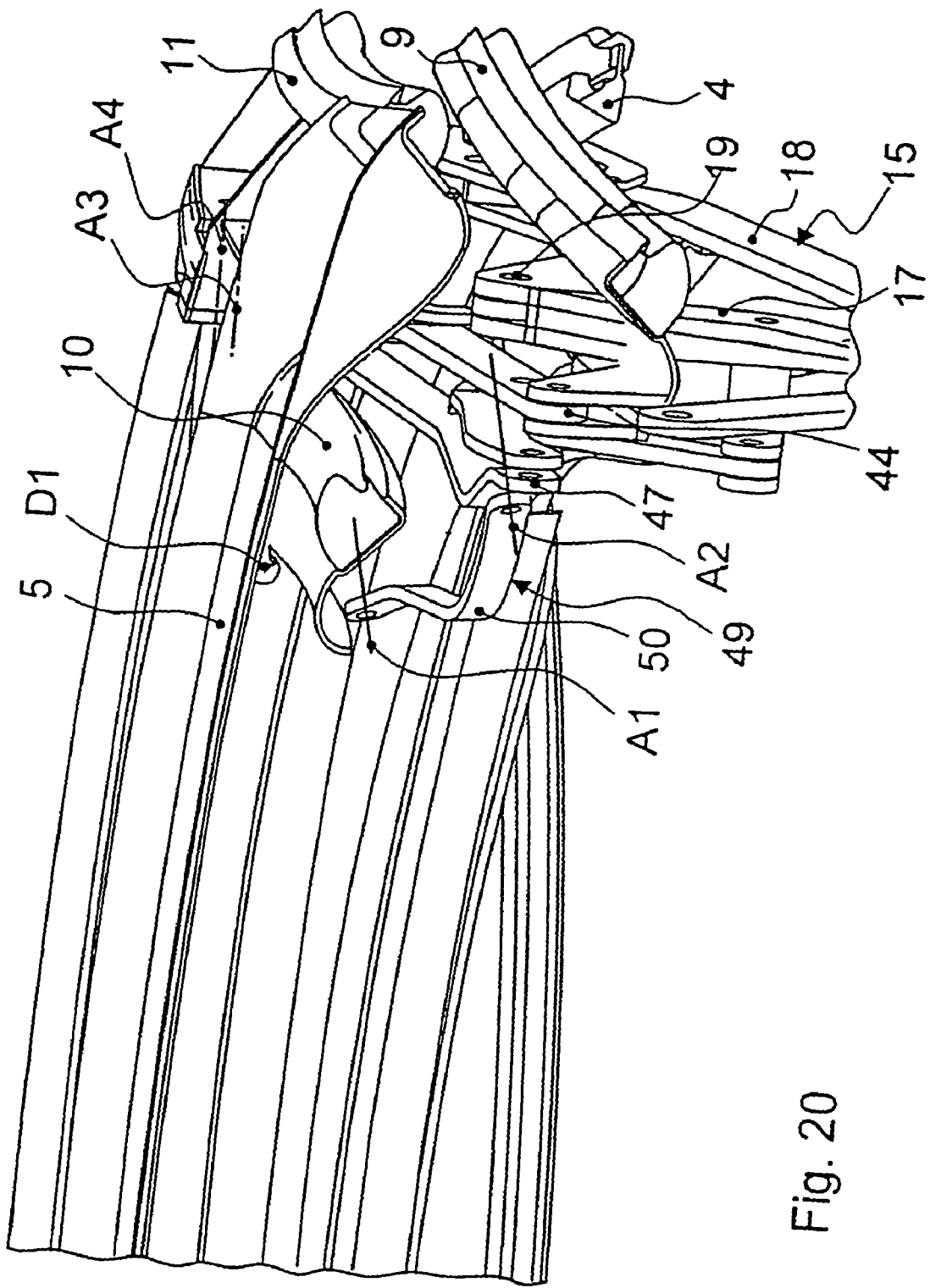

FIG. 19 the convertible top mechanism according to FIG. 15 through FIG. 18 in the folded position with the top completely down;

FIG. 20 the convertible top according to FIG. 13 through FIG. 19 in the folded position from a perspective at the left of the vehicle toward the rear end.

FIG. 1 shows a convertible top 1 for a convertible vehicle labeled as 2 on the whole, having a flexible roof membrane 3 comprised of multilayer textile material, for example, stretched between a rear-end main convertible top tension bar 4 in the top-up position 1 and a dimensionally stable roof tip 5 provided on a front windshield frame. The flexible roof membrane 3, only a detail of which is shown in FIG. 1, spans a rear-end roof segment 6, a central roof segment 7 and a front roof segment 8 between pairs of symmetrically arranged outer roof frame profiles 9, 10, 11, which are depicted for only one half of the vehicle in the drawing and are assigned to these roof segments opposite a longitudinal axis 33 of the vehicle and form the edges of the roof segments.

In the area of the rear-end roof segment 6, the flexible roof membrane 3 encompasses a dimensionally stable rear-end windshield 12, with a frame if necessary.

The outer roof frame profiles 9, 10, 11 are part of a convertible top mechanism by which the top 1 and thus the roof segments 6, 7, 8 can be folded and converted from a first end position (illustrated in greater detail in FIG. 1 through FIG. 3, for example), which represents a top-up position, into a second end position (shown in FIG. 9 through FIG. 11 in greater detail, for example), which represents a folded position with the top 1 down.

In the present embodiment, the convertible top mechanism is designed identically on both sides of the vehicle, so that embodiments with respect to the elements of the convertible top mechanism shown here also apply to the symmetrically arranged elements on the other side of the vehicle not shown here.

As shown in FIG. 1 and FIG. 2, for example, the respective outer roof frame profile 9 of the rear-end roof segment 6 forms a so-called main pillar, which in the present case is connected to a 4-bar linkage mechanism 15, which is in turn hinge-connected to two pivot points 13, 14 fixedly provided on the body and connected to an articulated chain 16 which transmits the movement introduced into the main pillar 9 to other elements of the convertible top mechanism.

FIGS. 1, 2, 4, 6, 8 and 9 illustrate the embodiment and functioning of the 4-bar linkage mechanism 15 during various movement phases of the convertible top 1. Said 4-bar linkage mechanism is designed with a first angled lever 17 and a second angled lever 18, each of which is rotatably mounted on a pivot point 13 and/or 14 fixedly provided on the body, and on the outer roof frame profile 9 of the rear-end roof segment 6.

The first lever 17 in the present embodiment is designed essentially in a U shape and is supported at one end of the leg on a joint 19 in an area of the outer roof frame profile 9 which is at the front in the up position of the top 1 and with its other end of the leg is rotatably connected to the pivot point 13 that is fixedly provided on the body and is assigned thereto, this pivot point being arranged offset to the front and higher than the pivot point 14 of the second lever 18, said pivot point also being fixedly provided on the body.

The second lever 18 is designed in the present case essentially in an L shape and is hinge-connected at its shorter leg to a bearing and/or joint 20 in a rear-end area of the outer roof frame profile 9 of the rear-end roof segment 6 and is connected at the end of its longer leg to the pivot point 14 that is fixedly provided on the body and assigned thereto.

For the movement of the convertible top 1 between its up position and its folded position in which it is folded with the elements of its convertible top mechanism and stored in a convertible top box and/or receptacle space (not shown here), in the present case, a drive 22 which is known per se is provided; this is an electro-hydraulic drive with a drive cylinder 23 and a drive rod 24 axially displaceable therein. In the embodiment shown here, it is advantageous for the flow of forces if the drive train 24 of the drive 22 is hinge-connected to the leg of the first lever 17 leading to the pivot point 13 fixedly provided on the body. However, the drive of the convertible top 1 may also act on any other locations in the convertible top mechanism regarded by those skilled in the art as suitable for the respective application case.

In the embodiment shown here, an articulated strap 25 comprised of two legs 26, 27 connects the rear window 12 to the 4-bar linkage mechanism 15 and is connected to the second lever 18 of the 4-bar linkage mechanism 15. A first leg 26 of the articulated strap 25 is rigidly connected to the second lever 18 of the 4-bar linkage mechanism 15 and aligned essentially axially to the longer leg thereof and is inclined in the direction of the center of the vehicle. A second leg 27 of the articulated strap 25 is arranged essentially perpendicular to the first leg 26, is connected to the rear window 12 and/or a frame surrounding same and is connected to the first leg 26 by means of a joint 28 so that it is pivotable about an axis of rotation running in the transverse direction of the vehicle.

In the embodiment of the convertible top 1 shown here, the rear-end main convertible top tension rod 4 is likewise mounted in an articulated manner on the second lever 18 of the 4-bar linkage mechanism 15.

With the movement of the top between its end positions, the rear window 12 and the outer roof frame profiles 9 of the rear-end roof segment 6 are guided in a movement in the same direction, with the rear window 12 and the outer roof frame profiles 9 of the rear roof segment 6 being arranged essentially parallel to one another during the movement.

Because of this movement in the same direction, which is implemented advantageously by the 4-bar linkage mechanism 15 described here, but may also be implemented by another corresponding mechanism that executes deflections in other embodiments, a clearly smaller length of cloth is needed than is the case with convertible tops in which the main pillar and the rear window are rotated toward one another during the top-down and/or top-up movements of the convertible top. Thus the packing height when the convertible top 1 is folded and stored is also reduced accordingly.

A clear reduction in the packing height of the convertible top in the folded state is also achieved with the convertible top 1 according to this invention because the roof segments 6, 7 and 8 are arranged essentially one atop the other with the curvature in the same direction in the folded position with the convertible top 1 down, and the outer roof frame profiles 10 of the central roof segment 7 are rotated in the direction of the center of the vehicle and are displaced in a manner to be explained in greater detail below with respect to a position in which the convertible top 1 is up.

In the embodiment according to FIG. 1 through FIG. 12, a guide mechanism 21 with a guide rod 29 motion-coupled to the convertible top mechanism for the outer roof frame profile 10 is provided for the outer roof frame profile 10 for rotation of said outer roof frame profile 10 of the central roof segment 7 in the direction of the center of the vehicle in a top-down movement and in the opposite direction in a top-up movement of the convertible top 1, with the guide of the outer roof frame profile 10 on the guide rod 29 in this embodiment, illustrated in greater detail in particular in FIG. 3 through FIG. 8, being implemented by means of a combined axial and rotational movement in which the axial movement of the outer roof frame profile 10 with respect to the guide rod 29 takes place as a function of the movement of the main pillar transmitted by the articulated chain 16 and/or the outer roof frame profile 9 of the rear-end roof segment 6 and the drive 22.

The axial movement of the outer roof frame profile 10 is converted into a rotational movement of the outer roof frame profile 10 of the central roof segment 7 by a guide, which is designed here as a spiral groove 30 provided in the guide rod 29; this is accomplished by the outer roof frame profile 10 sliding along the groove 30 by means of a sliding block 31 which is coupled via coupling element 32 to the articulated chain 16 and thus the kinematics of the convertible top mechanism.

From a comparison of the position of the outer roof frame profile 10 of the central roof segment 7 with respect to the guide rod 29 when the convertible top 1 is partially down according to FIG. 3, which shows the area of the guide rod 29 as seen from the center of the vehicle, during an additional movement phase for putting down the convertible top 1, which is shown in FIG. 5 in an oblique view from the left rear-end area of the convertible vehicle, and during a continued stage of movement of the top-down movement of the convertible top 1, which is shown in FIG. 7 from the perspective of a left vehicle front area of the convertible vehicle, it can be seen that the outer roof frame profile 10 of the central roof segment 7 is displaced along the guide rod 29 and in doing so undergoes a rotation about an axis parallel to the longitudinal axis 33 of the vehicle, ultimately rotating it 180° until reaching the folded position when the convertible top 1 is completely down (FIG. 9 through FIG. 11).

The connection between the outer roof frame profile 10 and the guide rod 29 may be accomplished, as shown in greater detail in FIG. 12, by means of a connecting strap 34 fixedly attached to the outer roof frame profile 10 and the sliding block 31, but in other embodiments it is of course also possible to select a different comparable guide, with a kinematic reversal may being provided.

In the preferred embodiment illustrated here, the guide rod 29 is connected in an articulated joint at one end to the front roof segment 8 and at the other end to the articulated chain 16 of the convertible top mechanism. The coupling element 32 which couples the sliding block to the movement sequence of the convertible top mechanism is designed like a rod and is mounted to pivot about a pivot axis running in the transverse direction of the vehicle and is axially secured on the sliding block 31 by a ring body 35 which engages in a groove on the sliding block 31, said ring body being pivotably mounted with the rod-like coupling element 32 to pivot about a pivot axis running in the transverse direction of the vehicle, and it is rotationally movably mounted with respect to the sliding block 31 via a rotatability between the ring body 35 and the sliding block. The coupling element 32 is connected to the articulated element 16 of the convertible top mechanism via an articulated chain 36 on its end opposite the sliding block 31.

For accordion folding of the roof segments 6, 7, 8 in the top-down movement of the convertible top 1, the articulated chain 16 of the convertible top mechanism is designed with a first articulated bracket 37 with two legs 38, 39 and a second articulated bracket 40 with the leg 38 and an additional leg 42, with the articulated brackets being rotationally connected to one another in an articulated joint and supported on the outer roof frame profile 9 of the rear-end roof segment 6.

The first articulated bracket 37 connected in an articulated manner to the leg of the first lever 17 of the 4-bar linkage mechanism 15, said leg facing the main pillar 9, can thus transmit the movement initiated into the main pillar 9 via the second articulated bracket 40 to the guide rod 29 and the coupling element 32 and thus to the outer roof frame profile 10 of the central roof segment 7. The leg 43 facing the guide rod 29 and the coupling element 32 is therefore designed as an articulated block which is connected by the articulated element 36 to the coupling element 32 which guides the outer roof frame profile 10 of the central roof segment 7 on the guide rod 29 and is connected by another joint 43 which is arranged in an area of the leg, i.e., the articulated block 42, at the front in the up position of the convertible top 1, is connected to the guide rod 29.

FIG. 13 through FIG. 20 show another embodiment of the convertible top linkage mechanism with a guide mechanism 21χ [sic?] for the outer roof frame profile 10 of the central roof segment 7, said guide mechanism being modified in comparison with the embodiment according to FIG. 1 through FIG. 12. By means of said guide mechanism, the outer roof frame profile 10 is rotatable in the direction of the center of the vehicle with a top-down movement of the convertible top 1 and/or in the reverse direction with a top-up movement.

The guide mechanism 21χ [sic; 21'] has a control rod 47 which is coupled to the convertible top mechanism and is connected at one end by a joint 48 to the front roof segment 8 and/or on the side of which facing the center of the vehicle of whose outer roof frame profile 11 is arranged on the respective side and is pivotable about a pivot axis A4 parallel to the transverse axis of the vehicle at the joint 48. At its other end, the control rod 47 is connected in an articulated joint to the articulated chain 16 of the convertible top mechanism, with the leg 42 of the second articulated bracket 40 provided for connecting the guide rod 29 according to FIG. 1 through FIG. 12 being replaced here by a leg 42χ [sic; 42'] having one less joint.

The outer roof frame profile 10 of the central roof segment 7 is connected in an articulated joint to the control rod 47 by a lever arrangement 49 which is pivotable about three tilted axes A1, A2, A3, with the tilted axes A1, A2, A3 running at an angle to the pivot axis A4 of the control rod 47 such that the outer roof frame profile 10 is displaced in the direction of the center of the vehicle and rotated with respect to the axis parallel to the longitudinal axis 33 of the vehicle from its position in the up position of the convertible roof 1 with a pivoting of the control rod 47.

The lever arrangement 49 is designed with a first pivot lever 50 which connects the outer roof frame profile 10 to the control rod 47 in an articulated joint, with the first pivot lever 50 being pivotable about a first tilted axis Al with respect to the outer roof frame profile 10 of the central roof segment 7 and pivotable about a second tilted axis A2 with respect to the control rod 47. The articulated connection of the first pivot lever 50 on the control rod 47 about the second tilted axis A2 is arranged in an end area of the control rod 47 which faces away from the connection of the control rod 47 to the front roof segment 8. The articulated connection of the first pivot lever 50 on the outer roof frame profile 10 about the first tilted axis A1 is in a rear-end area of the outer roof frame profile 10 when the convertible top 1 is in the up position.

In addition, the lever arrangement 49 is designed with a second pivot lever 51 which connects the outer roof frame profile 10 of the central roof segment 7 to the front roof segment 8 and/or in the embodiment shown here, connecting it to its roof frame profile 11 arranged on the respective side of the vehicle in an articulated joint. The second pivot lever 51 here is pivotable about a pivot point D1 with respect to the outer roof frame profile 10 of the central roof segment 7 by means of a ball joint 52, indicated only schematically in FIG. 13 through FIG. 20. With respect to the front roof segment 8, the second pivot lever 51 is pivotable about a third tilted axis A3.

The second pivot lever 51 is connected to the front roof segment 8 by an articulated joint 53 which is arranged on the side of the outer roof frame profile 11 of the front roof segment 8 facing the center of the vehicle in the rear-end area thereof, namely toward the rear end of the articulated joint 48 for connecting the control rod 47. The ball joint 52 for connecting the second pivot lever 51 to the outer roof frame profile 10 of the central roof segment 7 is arranged in an area toward the front of the outer roof frame profile 10 in the up position of the convertible top 1.

The pivot levers 50, 51 of the lever arrangement 49 are each designed with a curvature, with the bends in the respective pivot levers 50, 51 being designed so that they no longer collide with other components, while the outer roof frame profile 10 of the central roof segment 7 describes a curve in a movement of the convertible top 1 between its end positions and is pivoted 180°.

In the two embodiments of the convertible top mechanism described here, the front roof segment 8 and/or its respective outer roof frame profile 11 are tied into the kinematics of the convertible top mechanism in such a way that it is hinge-connected at the rear end of the articulated connection of the guide rod 29 and/or the control rod 47 for the outer roof frame profile 10 of the central roof segment 7 to a rod 44 which leads to a front area of the outer roof frame profile 9 of the rear-end roof segment 6 and which also supports one of a plurality of convertible top tension bars 45 that extend under the roof membrane 3.

With the preferred designs of the convertible top mechanism described here, the roof segments 6, 7, 8 can be brought into their folded position in such a way that the rear-end roof segment 6 is deposited first, the central roof segment 7 is deposited above that and the front roof segment 8 is situated at the top, with the roof segment 6, 7, 8 being arranged tightly one above the other and stored with a low packing height, their curvature in the stored position facing away from a bottom of the vehicle whose installed position is labeled as 46 in the figures.

The invention claimed is:

1. Convertible top for a convertible vehicle (2) having a rear-end roof segment (6) and at least one additional roof segment (7, 8), with the roof segments (6, 7, 8) being foldable in accordion fashion via a convertible top mechanism, and at least the rear-end roof segment (6) being designed with a flexible roof membrane (3) forming a soft top, the roof membrane being accommodated between outer roof frame profiles (9, 10, 11) arranged in symmetrical opposition with a vehicle longitudinal axis (33) and a dimensionally stable rear window (12), characterized in that the rear window (12) and the outer roof frame profiles (9) which are assigned to the rear-end roof segment (6) are converted into a folded position toward the rear in an essentially non-rational movement in the same direction when the top (1) is down or is converted out of the folded position toward the front in an essentially non-rotational movement in the same direction.

2. Convertible top in accordance with claim 1, characterized in that the rear window (12) and the outer roof frame profiles (9) of the rear-end roof segment (6) are arranged essentially parallel to one another during their movement into or out of the folded position.

3. Convertible top in accordance with claim 1, characterized in that the roof segments (9, 10, 11) are situated essentially one above the other in the folded position such that their curvature is facing in the same direction when the convertible top (1) is open.

4. Convertible top in accordance with claim 3, characterized in that the roof segments (9, 10, 11) are situated one above the other in the folded position such that their curvature is facing a vehicle bottom (46).

5. Convertible top in accordance with claim 1, characterized in that an outer roof frame profile (9) of the rear-end roof segment (6) has a four-bar linkage mechanism (15) hinge-connected on two pivot points (13, 14) fixedly provided on the body and is connected to an articulated chain (16) which transmits a movement to the other roof segments (7, 8).

6. Convertible top in accordance with claim 5, characterized in that the four-bar linkage mechanism (15) is designed with a first angled lever (17) and a second angled lever (18), each of which is hinge-connected to a pivot point (13, 14) fixedly provided on the body and to the outer roof frame profile (9).

7. Convertible top in accordance with claim 6, characterized in that the pivot point (13) of the first lever (17) is fixedly provided on the body and is arranged so it is offset higher and toward the front in comparison to the pivot point (14) of the second lever (18) which is fixedly provided on the body.

8. Convertible top in accordance with claim 6, characterized in that a joint (20) is provided between the first lever (18) and the outer roof frame profile (9) in an area at the front in the up position of the convertible top (1) and a joint (20) is provided between the second lever (18) and the outer roof frame profile (9) in an area of the outer roof frame profile (9) at the rear in the top-up position (1).

9. Convertible top in accordance with claim 6, characterized in that the first lever (17) is formed at least approximately in a U shape and the second lever (18) is designed at least approximately in an L shape, with the link to the outer roof frame profile (9) and to the pivot points (13, 14) that are fixedly provided on the body being arranged in the area of a leg end of the lever (17, 18).

10. Convertible top in accordance with claim 6, characterized in that the first lever (17) is connected to a drive (22) of the convertible top (1).

11. Convertible top in accordance with claim 5, characterized in that the rear window (12) is connected to the 4-bar linkage mechanism (15) by an articulated strap (25) and is connected to the outer roof frame profile (9) via the flexible roof membrane (3).

12. Convertible top in accordance with claim 6, characterized in that a main convertible top tension bar (4) is hinge-connected to the second lever (18).

13. Convertible top in accordance with claim 1, characterized in that outer roof frame profiles (10) which are assigned to at least one central roof segment (7) are rotated by means of a guide mechanism (21, 21') with respect to a position with the top (1) up by an axis at least approximately parallel to the vehicle longitudinal axis (33) and shifted in the direction of the center of the vehicle.

14. Convertible top in accordance with claim 13, characterized in that an outer roof frame profile (10) of the at least one central roof segment (7) is rotated by at least approximately 180° in the folded position in comparison to its position with the top (1) up.

15. Convertible top in accordance claim 13, characterized in that the guide mechanism (21) of the outer roof frame profile (10) of the at least one central roof segment (7) has a guide rod (29) coupled to the top mechanism, the outer roof frame profile (10) being guided axially on this guide rod so that it is rotated about its longitudinal axis in an axial movement with respect to the guide rod (29).

16. Convertible top in accordance with claim 15, characterized in that the outer roof frame profile (10) with a sliding block (31) engages in a spiral groove (30) created in the guide rod (29), with the sliding block (31) being linked by a coupling element (32) to the kinematics of the convertible top mechanism.

17. Convertible top in accordance with claim 16, characterized in that the coupling element (32) is connected first to the sliding block (31) in an axially fixed and rotationally movable manner and is connected second like a hinge to an articulated element (36) of an articulated chain (16) of the convertible top mechanism.

18. Convertible top in accordance with claim 13, characterized in that the guide mechanism (21) of the outer roof frame profile (10) of the at least one central roof segment (7) has a control rod (47) coupled to the convertible top mechanism and pivotable about a pivot axis (A4) running parallel to the transverse axis of the vehicle and to which the outer roof frame profile (10) is hinge-connected by a lever arrangement (49), with the lever arrangement (49) being pivotable about tilted axes (A1, A2, A3) which run at an angle to the pivot axis (A4) of the control rod (47) such that the outer roof frame profile (10) is shifted in the direction of the center of the vehicle and is rotated with respect to an axis parallel to the longitudinal axis (33) of the vehicle when the control rod (47) is pivoted.

19. Convertible top in accordance with claim 18, characterized in that the control rod (47) is connected in an articulated joint to the front roof segment (8), in particular to its outer roof frame profile (11) arranged on the respective side.

20. Convertible top in accordance with claim 18, characterized in that a first pivot lever (50) of the lever arrangement (49) connects the outer roof frame profile (10) of the central roof segment (7) to the control rod (47) in an articulated joint, with the first pivot lever (50) being pivotable about a first tilted axis (A1) with respect to the outer roof frame profile (10) of the central roof segment (7) and being pivotable about a second tilted axis (A2) with respect to the control rod (47).

21. Convertible top in accordance with claim 20, characterized in that the articulated connection of the first pivot lever (50) to the control rod (47) is arranged around the second tilted axis (A2) in an end area of the control rod (47) facing away from the connection of the control rod (47) to the front roof segment (6).

22. Convertible top in accordance with claim 20, characterized in that the connection of the first pivot lever (50) to the outer roof frame profile (10) for pivoting about the first tilted axis (A1) is arranged in a rear-end area of the outer roof frame profile (10) in the up position of the convertible top (1).

23. Convertible top in accordance with claim 18, characterized in that a second pivot lever (51) of the lever arrangement (49) connects the outer roof frame profile (10) of the central roof segment (7) to the front roof segment (8), in particular to its roof frame profile (11) arranged on the respective vehicle side, in an articulated joint, with the second pivot lever (51) being pivotable about a pivot point (D1) with respect to the outer roof frame profile (10) of the central roof segment (7) and being pivotable about a third tilted axis (A3) with respect to the front roof segment (8).

24. Convertible top in accordance with claim 23, characterized in that the connection between the second pivot lever (51) and the outer roof frame profile (10) of the central roof segment (7) at the pivot point (D1) is designed by means of a ball joint (52).

25. Convertible top in accordance with claim 23, characterized in that the connection of the second pivot lever (51) on the front roof segment (8) is arranged in a rear-end area of the outer roof frame profile (11) of the front roof segment (8).

26. Convertible top in accordance with claim 23, characterized in that the connection of the second pivot lever (51) to the outer roof frame profile (10) of the central roof segment (7) is arranged in an area of the outer roof frame profile (10) of the central roof segment (7) that is at the front when the convertible top (1) is in the up position.

27. Convertible top in accordance with claim 18, characterized in that a guide rod (29) or the control rod (47) is connected to the front roof segment (8) of the convertible top mechanism in an articulated joint at one end and to an articulated chain (16) of the convertible top mechanism at the other end.

28. Convertible top in accordance with claim 13, characterized in that an articulated chain (16) of the convertible top mechanism has a first articulated bracket (37) and a second articulated bracket (40) for the transfer of movement, these articulated brackets opening and/or closing in opposition to one another and being rotationally connected to one another via a joint (43) arranged on the outer roof frame profile (9) of the rear roof segment (6), with the first articulated bracket (37) being hinge-connected to a first lever (17) of a 4-bar linkage mechanism (15) of the outer roof frame profile (9) of the rear roof segment (6) which is hinge-connected on two pivot points (A3, A4) fixedly provided on the body and is connected to the articulated chain (16) transmitting a movement to the other roof segments (7, 8), and to the second articulated bracket (40) being hinge-connected to a guide mechanism (21, 21') of the outer roof frame profile (10) of a central roof segment (7).

29. Convertible top in accordance with claim 13, characterized in that the outer roof frame profile (11) of a front roof segment (8) is hinge-connected on the rear end of the connection of the guide mechanism (21, 21') for an outer roof frame profile (10) of the central roof segment (7) with a rod (44) leading to a front area of the outer roof frame profile (9) of the rear-end roof segment (6).

* * * * *